United States Patent [19]

Filby

[11] 4,002,726
[45] Jan. 11, 1977

[54] METHOD OF RECYCLING LITHIUM BORATE TO LITHIUM BOROHYDRIDE THROUGH METHYL BORATE

[75] Inventor: Evan E. Filby, Rigby, Idaho

[73] Assignee: The United States of America as represented by the United States Energy Research and Development Administration, Washington, D.C.

[22] Filed: July 16, 1975

[21] Appl. No.: 596,550

[52] U.S. Cl. ............................. 423/287; 423/288; 423/648
[51] Int. Cl.² ........................................ C01B 6/21
[58] Field of Search ................... 423/286–288, 423/648, 657; 252/182

[56] References Cited

UNITED STATES PATENTS

| | | | |
|---|---|---|---|
| 2,970,114 | 1/1961 | Bragdon | 423/286 X |
| 3,151,930 | 10/1964 | Bragdon et al. | 423/287 |
| 3,405,068 | 10/1968 | Hiltz | 423/657 X |
| 3,515,522 | 6/1970 | Pecak et al. | 423/287 |

OTHER PUBLICATIONS

Adams, *Metallo-Boron Compound and Boranes*; Interscience Publishers; N.Y., 1964; pp. 382–384.

*Primary Examiner*—G. O. Peters
*Attorney, Agent, or Firm*—Dean E. Carlson; Arthur A. Churm; Robert J. Fisher

[57] ABSTRACT

This invention provides a method for the recycling of lithium borate to lithium borohydride which can be reacted with water to generate hydrogen for utilization as a fuel. The lithium borate by-product of the hydrogen generation reaction is reacted with hydrogen chloride and water to produce boric acid and lithium chloride. The boric acid and lithium chloride are converted to lithium borohydride through a methyl borate intermediate to complete the recycle scheme.

8 Claims, 1 Drawing Figure

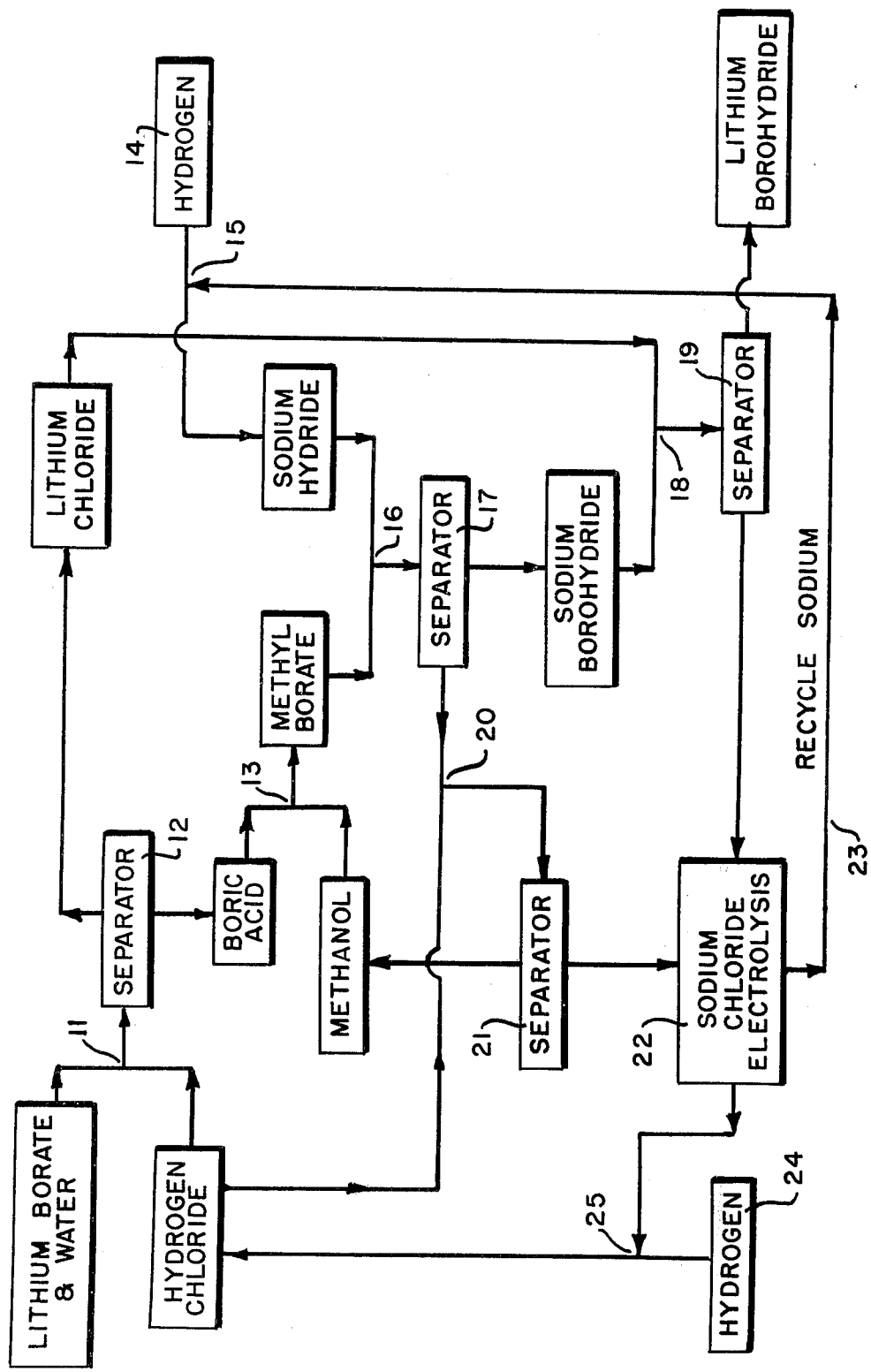

METHOD OF RECYCLING LITHIUM BORATE TO LITHIUM BOROHYDRIDE THROUGH METHYL BORATE

CONTRACTUAL ORIGIN OF THE INVENTION

The invention described herein was made in the course of, or under, a contract with the U.S. ENERGY RESEARCH AND DEVELOPMENT ADMINSTRATION.

BACKGROUND OF THE INVENTION

This invention relates generally to the use of hydrogen gas as a fuel and is concerned with a secondary source which enables the storage and subsequent controlled liberation of hydrogen gas for use as a fuel. The invention concerns such a secondary source which is also readily adaptable to use in mobile systems.

More particularly, this invention concerns the use of lithium borohydride as such a source of hydrogen and specifically is directed toward a method of recycling the lithium borate by-product of the hydrogen generation reaction back to the lithium borohydride starting material.

As the energy squeeze continues, and at times reaches crises proportions, increasing interest and concern is directed toward the development of new sources of energy. A most important concern is the continuing and ever increasing consumption of our limited fossil fuels with the consumption of petroleum-derived fuels being an acute concern. As the consumption of petroleum continues and in fact increases, reducing the world's limited known reserves, efforts are directed toward the development of alternative energy sources to alleviate the pressing demand for more energy. A particular concern is the enormous amount of pertroleum being burned as motor vehicle fuel and as fuel at central electric power-generating stations. An alternative fuel for these applications is especially desired in view of the enormous amount of fuel so consumed and in view of the fact that petroleum can more valuably be put to use in other products, i.e. plastics, lubricants, synthetics, etc.

One possible and highly potential alternative fuel which has been proposed and widely considered is hydrogen. In fact, proponents of the development of hydrogen as an alternative fuel have gone so far as to suggest the possibilities of a "hydrogen economy", that is, that the development of hydrogen as an alternative fuel will lead to and result in the use of hydrogen gas as a major if not the major fuel of the future. As a fuel, hydrogen gas does have potential and does offer several significant advantages, not the least of which is that it is a non-polluting fuel since its only combustion product is water vapor. This is a most important consideration in view of the equally important concern for protecting the environment.

The use of hydrogen gas as a fuel does not present any significant hurdles as many kinds of motors have been converted to run on gas and hydrogen fuel cells are widely known. Such use of hydrogen gas as a fuel is possible employing either hydrogen gas by itself or as a diluent in conjunction with natural gas. It has been proposed that hydrogen gas can be burned or used in fuel cells at individual locations, being pumped to the separate individual locations much as natural gas is today. Alternatively, hydrogen gas can be produced and stored during periods of lower power demands for subsequent burning at central power plants to produce electricity during peak power demands. Hydrogen can also be used as a motor vehicle fuel, in much the same manner as propane or butane is used at present. Various types of vehicle motors can be converted to run on the gas with common sources of the hydrogen gas being a supply of cryogenic liquid hydrogen or gas bottled under pressure.

However, since the use of pressurized bottled hydrogen or liquid hydrogen does present a number of difficult storage and handling problems, alternative materials as possible secondary sources of hydrogen gas have been extensively investigated. The difficulty with many of the alternatives and secondary sources proposed is the considerable weight penalties which are incurred with the proposed materials. This difficulty is a severe disadvantage in portable hydrogen source applications such as in motor vehicles.

The present invention was devised in response to a problem confronting a co-worker, James L. Lofthouse, who devised a method for the production of hydrogen for utilization as a fuel by storing the hydrogen in solid form as a light alkali metal borohydride and subsequently liberating the hydrogen as a gas by reacting with water. This method is the subject of a co-pending U.S patent application Ser. No. 596,554 filed July 16, 1975. It was found that because of its extremely favorable material-weight to hydrogen-production ratio lithium borohydride was a particularly favorable and advantageous secondary source of hydrogen, especially proving advantageous for use in mobile fuel systems. The lithium borohydride can be reacted with water to produce hydrogen, leaving lithium borate as a by-product. A further discussion of this method and its advantages as well as a detailed discussion of the present invention is contained in the report "Possibilities for Lithium Borohydride Recycle" by the present applicant, Evan E. Filby, Allied Chemical Corporation — Idaho Chemical Programs Report ICP-1054, which report is incorporated herein by reference. This report was abstracted in the Nov. 30, 1974 issue of Nuclear Science Abstracts, Vol. 30, Abstract No. 28830, and is available from the National Technical Information Service, U.S. Department of Commerce, Springfield, Va. 22151.

Since the lithium borate by-product contains the valuable materials lithium and boron and it is highly desirable to avoid the waste of these materials, it is an object of the present invention to provide a method for the recycling of these materials from the lithium borate by-product.

Since it is also preferable that the boron and lithium be recycled to reconstitute the borohydride, it is also an object of the present invention to provide a method of recycling lithium borate to lithium borohydride.

It is another object of the present invention to provide a recycle scheme in which the reaction steps involved are industrially attractive.

Another object of the present invention is to provide a recycle scheme in which an acceptable energy balance exists.

Other objects and advantages of the present invention will become apparent upon reading the following description of the invention.

SUMMARY OF THE INVENTION

In accordance with the present invention, lithium borate is recycled to lithium borohydride by reacting the lithium borate with hydrogen chloride and water to produce boric acid and lithium chloride. The lithium chloride and boric acid so produced are converted to lithium borohydride through a methyl borate intermediate.

BRIEF DESCRIPTION OF THE DRAWING

Other aspects and features of the present invention will become apparent upon reading the following detailed description of the invention together with reference to the drawing which is a flow diagram of the essential features of a preferred embodiment of the recycle scheme for lithium borate in accordance with the present invention.

DETAILED DESCRIPTION OF THE INVENTION

While the present invention is equally applicable to the recycle to lithium borohydride of lithium borate from other sources, the present method is particularly concerned with recycling lithium borate which is formed as a by-product of the reaction between lithium borohydride and water to produce hydrogen. The lithium borate by-product of this reaction may be a damp solid, a thick slurry, or a solution. Whatever the form of the lithium borate or its origin, the initial step in the recycle scheme is the treatment of the lithium borate material itself with hydrogen chloride and water to produce boric acid and lithium chloride.

$$LiBO_2 + HCl + H_2O = LiCl + H_3BO_3$$

Following the initial reaction, the lithium chloride and boric acid products are separated. While various separation techniques could be employed, separation of the two products on the basis of solubility should be an easy and straightforward procedure since lithium chloride is significantly more soluble in water than boric acid. The solubilities of these materials are 27.6 g/100 g $H_2O$ at 100° C and 2.42 g/100 g 0° C for boric acid as compared to 130 g/100 g $H_2O$ at 95° C and 63.7 g/100 g $H_2O$ at 0° C for lithium chloride. An additional advantageous feature of separation based upon solubilities is that boric acid is even less soluble in water when lithium chloride is also present in the solution.

Following the initial reaction step and separation, the boric acid and lithium chloride are converted to lithium borohydride through a methyl borate intermediate. Methyl borate, the methyl ester of boric acid $B(OCH_3)_3$, can be prepared from the boric acid obtained in the initial reaction. One method of preparing the methyl borate is by direct reaction of the boric acid with methanol.

$$H_3BO_3 + 3 CH_3OH = B(OCH_3)_3 + 3 H_2O$$

The methyl borate so obtained is then reacted with an appropriate lithium specie obtained from the lithium chloride to produce the lithium borohydride.

One possible reaction route which could be used to obtain the borohydride is the reaction between lithium hydride and methyl borate.

$$4 LiH + B(OCH_3)_3 = LiBH_4 + LiOCH_3$$

The lithium hydride would be obtained from the lithium chloride, such as by electrolysis of the lithium chloride with subsequent reaction of the lithium with hydrogen. However, the lithium hydride - methyl borate reaction has the disadvantage that 75% of the lithium ends up in a by-product even though that by-product would be recyclable. The reaction also gives a low yield, only about 70%, and the products of the reaction pose difficulties in separation.

Consequently, an alternative set of reactions is preferred to generate the lithium borohydride from the methyl borate. The reaction of sodium hydride with methyl borate has a much higher yield, on the order of 90–94%, and presents no difficulties in product separation.

$$4 NaH + B(OCH_3)_3 = NaBH_4 + 3 NaOCH_3$$

This reaction is followed by the very attractive (90–95% yield with 97–98% purity) metathesis reaction with the lithium chloride to give lithium borohydride.

$$NaBH_4 + LiCl \xrightarrow[\text{solvent}]{\text{isopropylamine}} LiBH_4 + NaCl$$

Both the sodium methoxide by-product and the sodium chloride by-product of these two reactions can be recycled.

The use of the above set of reactions is also attractive in that the by-products are recyclable into the overall recycle scheme. The sodium hydride can be made by reacting hydrogen with sodium metal obtained from the sodium chloride or the sodium methoxide, the methoxide group likewise being recyclable through methanol. For example, the sodium methoxide can be reacted with hydrogen chloride to produce methanol and sodium chloride.

$$NaOCH_3 + HCl = NaCl + CH_3OH$$

The sodium metal can then be obtained by the electrolysis of sodium chloride from both this reaction and the above-mentioned metathesis reaction. The chlorine by-product of the electrolysis can be reacted with hydrogen to produce hydrogen chloride for use in other previously mentioned reaction steps.

$$4 NaCl = 4 Na + 2 Cl_2 (g)$$

$$4 Na + 2 H_2 = 4 NaH$$

$$2 H_2 (g) + 2 Cl_2 (g) = 4 HCl$$

Referring now to the drawing, there is shown a flow diagram of the essential features of a preferred embodiment of the method of recycling lithium borate to lithium borohydride in accordance with the present invention. Lithium borate, water, and hydrogen chloride are reacted at point 11 and the lithium chloride and boric acid products are separated, as represented by separator 12. The boric acid is reacted at point 13 with methanol to yield the methyl borate intermediate. A source of hydrogen 14 is necessary to introduce hydrogen into the recycle system, the hydrogen being reacted at 15 with sodium to produce the sodium hydride which is reacted at 16 with the methyl borate. Separator 17 serves to separate the sodium borohydride product from the sodium methoxide by-product, and sodium borohydride is then reacted with the lithium chloride at point 18 to produce the desired lithium borohydride end-product and sodium chloride. The lithium borohydride product is separated from the sodium chloride as represented by separator 19 and the sodium chloride by-product is cycled back into the recycle scheme.

The self-contained cyclic nature of the total recycle scheme can be appreciated from a consideration of the other reactions involving the various make-up materials. The sodium methoxide from separator 17 is reacted with hydrogen chloride at 20 to yield methanol and sodium chloride. These products are separated as indicated by separator 21 and the methanol is cycled back for reaction with boric acid at point 13 while the sodium chloride from separator 21 is combined with the sodium chloride from separator 19 for electrolysis to produce sodium metal and chlorine as is indicated at 22. The sodium from the electrolysis 22 is cycled along line 23 to point 15 where it is reacted with hydrogen to produce the sodium hydride. An additional source of hydrogen 24 introduces hydrogen into the recycle scheme for reaction at point 25 with the chlorine obtained from the electrolysis of sodium chloride 22 to produce the hydrogen chloride which in turn is reacted with lithium borate and water at point 11 or with sodium methoxide at point 20.

While from a practical standpoint, since yields of the reactions cannot be expected to be 100%, it will be necessary to add the various make-up materials, from a theoretical viewpoint the recycle system is self-contained, requiring only the input of hydrogen and energy in addition to the lithium borate starting material. This can perhaps be more fully appreciated by listing and summing the various reactions involved:

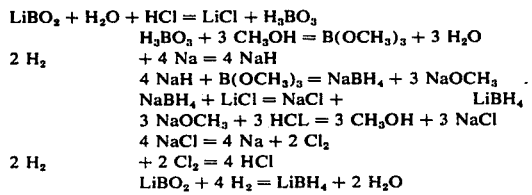

As is readily seen, the present method for the recycle of lithium borate to lithium borohydride is a nearly true cycle involving only the input of hydrogen, and of course energy. The amount of energy required to carry out this recycle scheme has been investigated and it has been found that the scheme poses an industrially feasible method for recycling lithium borate to lithium borohydride. The overall energy penalty for the cycle is more fully discussed in the above-cited report ICP-1054. The present method of recycle also offers the advantages that many of the individual reactions are known and employed on an industrial or semi-commercial scale in relation to other processes and applications and the chemicals and processes involved are nearly all liquids or solids dissolved in liquids which facilitates incorporation into an industrial-scale process.

The embodiments of the invention in which an exclusive property or privilege is claimed are defined as follows:

1. A process for the recovery of lithium borohydride from lithium borate formed as a by-product in the generation of hydrogen by the reaction of lithium borohydride with water comprising:
   a. reacting the lithium borate with hydrogen chloride and water to produce boric acid and lithium chloride;
   b. converting the boric acid to methyl borate;
   c. reacting said methyl borate with sodium hydride to produce sodium borohydride; and
   d. reacting the lithium chloride of step (a) with said sodium borohydride to produce lithium borohydride.

2. The method of claim 1 wherein said boric acid is reacted with methanol to produce the methyl borate.

3. The method in accordance with claim 2 wherein the sodium methoxide by-product of the reaction between sodium hydride and methyl borate is reacted with hydrogen chloride to produce methanol and sodium chloride and said methanol is cycled back into the recycle scheme.

4. The method of claim 3 wherein sodium chloride by-product is electrolyzed to sodium and chlorine, the sodium is reacted with hydrogen to produce sodium hydride, and the chlorine is reacted with hydrogen to produce hydrogen chloride and wherein the sodium hydride so produced and the hydrogen chloride so produced are cycled back into the recycle scheme.

5. A process for the recovery of lithium borohydride from lithium borate formed as a by-product in the generation of hydrogen by the reaction of lithium borohydride with water which comprises:
   a. reacting said lithium borate with hydrogen chloride and water to form boric acid and lithium chloride;
   b. converting said boric acid to methyl borate;
   c. converting said lithium chloride of step (a) to lithium hydride;
   d. reacting said lithium hydride with said methyl borate to form lithium borohydride.

6. The process of claim 5 wherein said boric acid is reacted with methanol to produce the methyl borate.

7. The process of claim 5 wherein said lithium chloride is converted to lithium hydride by electrolysis of said lithium chloride to produce lithium and chlorine with the subsequent reaction of the lithium with hydrogen to produce lithium hydride.

8. The method of claim 7 wherein the chlorine produced in the electrolysis of the lithium chloride is reacted with hydrogen to produce hydrogen chloride and the hydrogen chloride so produced is cycled back into the process scheme.

* * * * *